United States Patent [19]
Olivier

[11] Patent Number: 6,047,997
[45] Date of Patent: Apr. 11, 2000

[54] THREADED CONNECTION WITH RADIUSED SURFACES

[75] Inventor: Huey P. Olivier, New Iberia, La.

[73] Assignee: Iberia Threading, Inc., New Iberia, La.

[21] Appl. No.: 08/972,516

[22] Filed: Nov. 18, 1997

Related U.S. Application Data

[63] Continuation-in-part of application No. 08/648,406, May 15, 1996, abandoned.

[51] Int. Cl.[7] .................................................. F16L 25/00
[52] U.S. Cl. ........................ 285/333; 285/331; 285/390; 285/355
[58] Field of Search ................................. 285/333, 334, 285/355, 390, 331

[56] References Cited

U.S. PATENT DOCUMENTS

| | | | |
|---|---|---|---|
| 1,474,375 | 11/1923 | Moore | 285/355 |
| 2,006,520 | 7/1935 | Stone et al. | 285/146 |
| 2,258,066 | 10/1941 | Oyen | 285/146 |
| 3,658,368 | 4/1972 | Hokanson | 285/333 |
| 3,870,351 | 3/1975 | Matsuki | 285/334 |
| 4,161,332 | 7/1979 | Blose | 285/334 |
| 4,373,754 | 2/1983 | Bollfrass et al. | 285/334 |
| 4,377,302 | 3/1983 | Kohyama et al. | 285/334 |
| 4,525,001 | 6/1985 | Lumsden et al. | 285/328 |
| 4,538,840 | 9/1985 | DeLange | 285/333 |
| 4,548,431 | 10/1985 | Hall et al. | 285/334 |
| 4,572,589 | 2/1986 | White | 308/4 R |
| 4,611,838 | 9/1986 | Heilmann et al. | 285/331 |
| 4,619,472 | 10/1986 | Kozono et al. | 285/334 |
| 4,629,221 | 12/1986 | Lumsden et al. | 285/328 |
| 4,676,529 | 6/1987 | McDonald | 285/92 |
| 4,705,307 | 11/1987 | Chelette | 285/332.3 |
| 4,732,416 | 3/1988 | Dearden et al. | 285/333 |
| 5,078,430 | 1/1992 | St. Onge | 285/355 |
| 5,092,635 | 3/1992 | DeLange et al. | 285/334 |
| 5,154,452 | 10/1992 | Johnson | 285/355 |
| 5,415,442 | 5/1995 | Klementich | 285/331 |
| 5,709,416 | 1/1998 | Wood | 285/333 |
| 5,810,401 | 9/1998 | Mosing et al. | 285/390 |

FOREIGN PATENT DOCUMENTS

| | | | |
|---|---|---|---|
| 1300262 | 6/1952 | France. | |
| 4212278 | 10/1993 | Germany | 285/355 |
| 6615311 | 5/1967 | Netherlands. | |
| 511468 | 4/1976 | U.S.S.R. | 285/390 |
| 9429627 | 12/1994 | WIPO. | |

OTHER PUBLICATIONS

Petroleum Engineering Handbook; Society of Petroleum Engineers; Chapter Two; *Casing, Tubing & Line Pipe*; W. O. Clinedinst; (pp. 2:1–2:74); Copyright 1987.

*Primary Examiner*—Eric K. Nicholson
*Attorney, Agent, or Firm*—Conley, Rose & Tayon, P.C.

[57] ABSTRACT

A drill string includes a plurality of tubular members each having a connection with a pin connector and a box connector on adjacent tubular members. The pin connector has an external thread adapted for threadingly engaging an internal thread on the box connector of the adjacent tubular member. The pin connector has an outer groove for receiving a protuberance on the terminal end of the box member. The protuberance and groove have contoured surfaces providing large metal-to-metal contact for preventing the contoured surfaces from sliding during over-torquing and cyclic bending of the drill string.

15 Claims, 4 Drawing Sheets

Fig. 5
Fig. 10
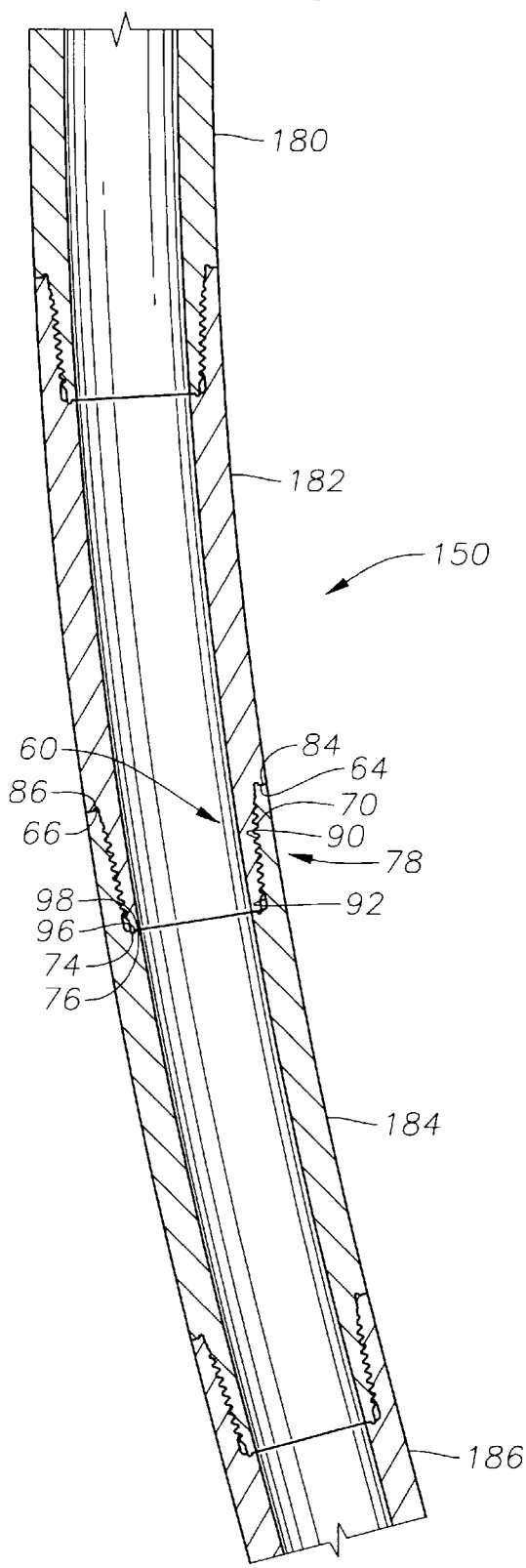
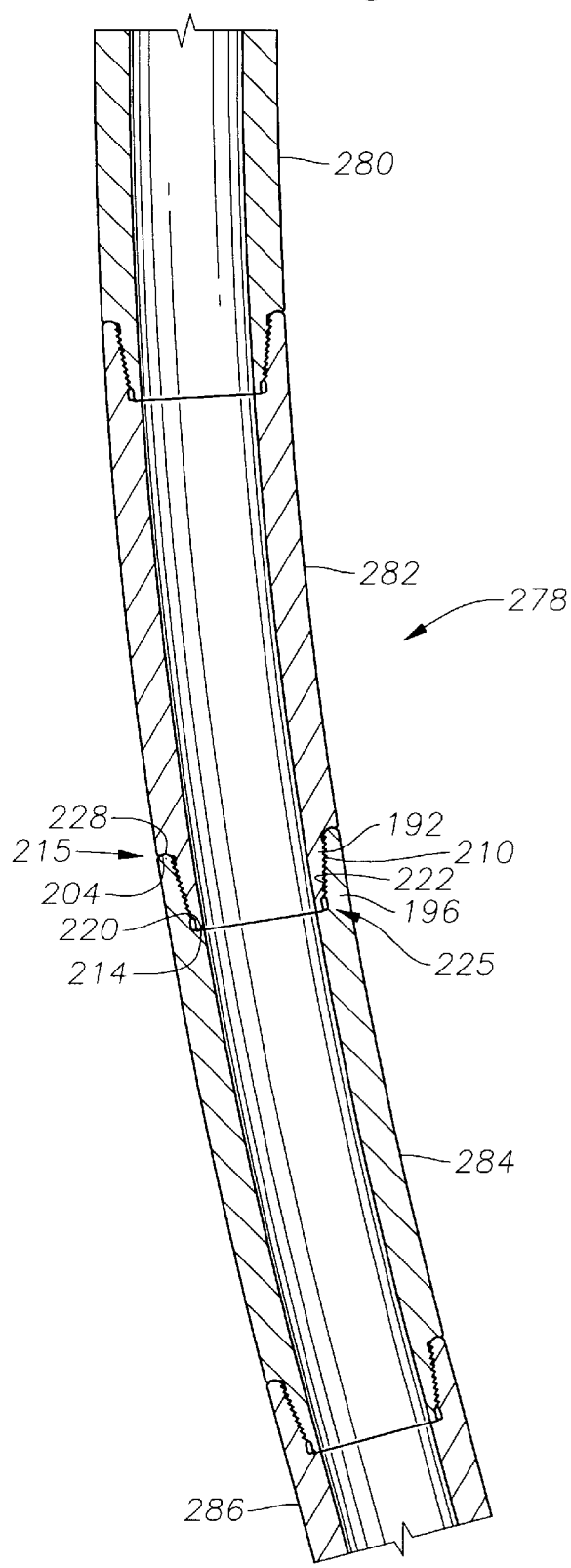

THREADED CONNECTION WITH RADIUSED SURFACES

RELATED APPLICATION

This is a continuation-in-part of U.S. patent application Ser. No. 08/648,406, filed May 15, 1996, now abandoned and entitled "Novel Locking Design", incorporated herein by reference.

BACKGROUND OF THE INVENTION

This invention relates to a connection for drill pipe and more particularly, pin and box connectors disposed on the ends of tubular members for connecting the tubular members for the drilling of bore holes in the pipeline and utility industry.

Drill strings are specifically designed for the installation of telephone lines, fiber optic cable, sewage lines, water lines, and similar installations relating to utilities for the pipeline and utility service industry. The typical objective is to drill a bore hole from point A to point B, generally under some type of obstacle or structure for the installation of a utility. Typically the bore hole distance drilled is between 200 and 600 feet. Also typically the bore hole is shallow and is generally horizontal.

In a typical drilling operation, a bit, such as a fishtail bit, is mounted on the end of the drill string with a transmitter located just behind the bit. The drill string is placed in compression and rotated to rotate and apply force on the bit to drill the bore hole. Fluids are circulated through the drill string and bit and then back up the annulus formed between the wall of the bore hole and drill string to moisten the earth through which the bit is drilling. This lessens the tendency for the drill string to stick in the bore hole. A hand-held receiver is located above ground to follow the transmitter and determine the orientation of the bit, i.e. inclination and azimuth. The operator then adjusts the orientation of the bit if the bit varies from the trajectory of the proper bore hole path between points A and B.

Once the bore hole is drilled under the obstacle, then the bit is removed and a reamer is attached to the end of the drill string and the drill string and reamer are pulled back through the bore hole. The drill string is placed in tension as the reamer passes back through the bore hole.

The operator minimizes the amount of fluid that is circulated through the drill string because too much fluid into the surrounding earth bore is undesirable. If too much fluid is circulated through and around the drill string, the fluid begins to wash out the sand, dirt, and earth causing a washout underneath the obstacle or structure, such as a highway or waterway, under which the bore hole is being drilled. Structural problems will be created if a void is formed underneath a highway or some other structure.

Drill strings for the pipeline and utility industry are much different from that used in the oilfield. In oil field drilling, a drill string is used to drill a wide open bore hole. Drilling fluid is circulated to remove cuttings and cool the bit. Thus, it is important that the connections in the drill string be sealed from pressure and fluid.

Typically it is not important whether there is fluid leakage through the connection in a drill string for the pipline and utility industry. Thus the connections between joints of drill pipe are not required to seal against pressure or fluids and heat and pressure are not of concern. The only pressure is the pump pressure for flowing drilling fluid.

When designing the drill string and other related tubular goods for a particular drilling application, not only must the physical orientation of the drill string be taken into consideration, but also the desired use. The drill string may be placed in a horizontal orientation, or in a vertical orientation, or in a deviated position. The actual orientation depends on the type of application.

The successful drilling of bore holes in the pipeline and utility industry requires the assembly of many individual tubular members into a drilling string. The actual assembly entails the make-up and torquing of individual tubular members. The actual drilling process involves multiple make-ups and breakdowns of the connections between individual tubular members of the drilling string. The number of makes and breaks depends upon the environment and the operator. Typically, a connection will be made up and broke out four or five times a day and could be as high as six or seven times a day. Thus, a connection between joints of pipe may have a 1,000 or more makes and breaks a year and therefore must be robust and rugged to withstand such use. Also, the assembly is performed very quickly since time considerations are very important.

Design considerations for the connections for the drill string joints include, but are not necessarily limited to, the repetitive coupling and uncoupling of the connections, torquing, bending, cyclic loading, fatique, tensile loads, and compressive strength. The connection typically includes threaded pin and box connections. The threads must be capable of making up easily with other threaded joints. The longevity of the individual thread is also very important for several reasons. First, once a thread begins to deform, further deformation is usually exponentially increased thereafter. Second, once the thread has deteriorated, the entire drill string must be disregarded since the length of the drill string has very limited variance. Third, failure of the thread while the drill string is in the process of actually drilling a bore hole will cause substantial monetary damage. The preceding list is meant to be only illustrative.

Despite these designs, when a drill string member has a thread that is used in multiple applications for the drilling of bore holes in the utility and pipeline industries, the mating shoulders may become flared due to over torquing. Also, the prior art designs result in the thread profile becoming deformed which in turn causes the external and internal thread design profiles to lose their make-up capability and results in premature failure. Once deformation begins, continued use exponentially increases mating problems between cooperating tubular members. Further, once the pin 150 and box 152 are unscrewed, and thereafter, when made up again, the deformation forces will only be enhanced. In other words, the multiple screwing and unscrewing of the connections accelerates the deformation process so that once the deformation begins to occur, the process will thereafter exponentially increase.

FIG. 1 illustrates a prior art connection and the inherent problem with multiple fastening and unfastening of prior art connections in the utility industry due to over torquing and cycling of the box and pin. The prior art connection typically includes a pin end 150 for mating with a box end 152. The pin end 150 includes an annular shoulder 154 which is perpendicular to the axis of the connection. A round thread external thread profile 156 extends from shoulder 154 to an outer diameter 158. A radial terminal end 160, also perpendicular to the axis of the connection, extends from outer diameter 158 to an inner diameter 161.

The box end 152 includes a radial terminal end 162 having a surface which is perpendicular to the axis of the connection. A round thread internal profile 164 extends from terminal end 162 to an internal surface 166. A radial shoulder 168 extends from internal surface 166 to the internal diameter 170 of the tubular member.

As shown in FIG. 1, the radial terminal end 162 has slid on shoulder 154 and become deformed. One cause for this deformation may be the over torquing of the box 152 and pin 150 ends whereby the radial end 162 has been forced to slide outwardly on the face of shoulder 154 of the pin end 150. The forces thus applied may also deform the radial end 160 of the pin 150 such that the radial end 160 has been deformed, and in particular, by the outer surface 158 and the matching inner surface 161 being expanded outward by the compressive action of the radial shoulder 168 being forced into the radial end 160.

The over torquing situation will also cause the thread profiles to no longer match properly. Thus, as shown in FIG. 1, a first gap 172 and a second gap 174 emerges. Of course, while FIG. 1 represents two gaps 172, 174, other gaps along the thread profile may in fact occur.

Cyclic bending, also known as rocking, i.e lateral forces allow the pin end 150 to move or slide relative to the box end 152, is another cause of the flaring so as to form gaps 172, 174. Ideally, there should be no abrupt change in the direction of drilling. However, many applications, such as deviated settings, produce several abrupt dog legs or kinks in the borehole due to the operator making abrupt changes in the direction of drilling. Abrupt changes in drilling trajectory causes tortuosity which is a term describing a borehole which has a twisted trajectory. Tortuosity substantially increases the cyclic bending, torque and drag on the drill string.

As the pipe rotates and passes through a bend or an arch in the trajectory of the bore hole, the drill string bends causing the mating surfaces of the connection to slide back and forth particularly at the rotary shoulders. The smaller the radius of the bend in the bore hole, the greater fatigue that will be placed on the pin. As the drill string becomes deviated and twisted, the rocking within the thread profile will be exacerbated. As the deformation increases, the rocking can only escalate.

Each time the drill string is rotated once, it is called a cycle. The drill string rotates three to four hundred cycles per minute during the drilling operation. Each time the connection passes through a bend and rotates, the shoulders slide back and forth against each other. These repetitive cycles with sliding shoulders provides a continuing fatigue at the mid-portion of the pin. This causes substantial stress and causes the pin to break off at the connection. The pin tends to break near the base of the pin and is typical in the prior art joints. Once the pipe is rotated through an arch or bend in the bore hole, the terminal end of the box tends to slide away from the base of the pin. It tends to come apart as the two faces slide against each other. This causes the threads near the shoulder of the pin and the terminal end of the box to come apart. However, the connection continues to stay tight at the mid-portion of the threads. With the mid-threads holding tight and the shoulder of the pin and terminal end of the box rocking, the pin tends to break at the base. During one half of the cycle the pin is bent one way and then during the other half of the cycle it is bent the other way causing it to fatigue and break. This back and forth action causes tremendous fatigue. The pin typically breaks after a few thousand cycles. A corkscrew bore hole places peculiar bends and cycles on the drill string which may well double the bend radius capacity of the joint.

Also, during the drilling process, a large amount of compressive force is placed on the drill string which tends to drive the terminal box end outwardly as the surfaces' slide. The greater this force, the greater the gap between the base of the pin and the terminal end of the box. However, the mid-portion of the threads remain tight. Then at every cycle, the counter-stretching back and forth begins to fatigue the connection.

If the environment is very bad and if you have an inexperienced operator, the operator tends to over-compensate and steers too hard. An inexperienced operator also makes a direct turn with the drill string. Once the inexperienced operator realizes that he has turned the drill string too much, then he makes an abrupt turn in the other direction. This causes a tortuosity in the hole being drilled. This places the drill string in a very serious bind as it is rotated through the bore hole. The number of cycles that the connection will last is diminished considerably.

In the oil field, the drilling operators are much more experienced and the distances being drilled are much greater. Also, more sophisticated equipment is used so that the drilling is more controlled. Further, experts are continuously monitoring the drilling. In the utility industry, often the operators are inexperienced and force the drill string to achieve a bore hole from point A to point B and do not drill a smooth bore hole. Operators in drilling utility lines are more interested in getting the job completed than they are the wear and tear on their equipment.

It is preferred to have no movement between the surfaces because when there is movement, fatquing occurs. Once the surfaces begin to slip, then the stretching of the pin and box begins. The pin can absorb some stretching during the cycling of the drill string. If the stretch occurs within limits, fatigue does not set in. Once the stretching exceeds the limit, then the connection begins to fatigue and will break.

The connection of the present invention solves these and other problems and deficiencies of the prior art as will be more clear from the description of the advantages, features and embodiments that follow.

SUMMARY OF THE INVENTION

The invention includes a tubular string containing a first pipe having a pin connector and a second pipe having a box connector. The pin and box connectors have external and internal thread profiles, respectively, which are adapted for threaded engagement upon make-up of the connection.

In the preferred embodiment, the pin connector includes an external groove at the base of the external threads for receiving a protuberance on the terminal end of the box connector. The protuberance has a cross-section in the shape of a bull nose or radius which extends across the terminal end of the box connector. The groove on the pin connector has a radius sized to receive the protuberance upon the make-up of the connection. The mating protuberance and groove form a non-sliding engagement to substantially eliminate the sliding between the mating groove and protuberance.

In another embodiment, the pin and box connectors may include another non-sliding engagement between a protuberance and groove. The box end includes an internal groove adapted for receiving a protuberance on the terminal end of the pin connector. In this embodiment, there is effectively an external and internal groove and protuberance engagements on each connection.

An advantage of the present invention includes having the groove on the box connector match the protuberance on the pin connector. Another advantage includes the control of the swelling out of the box connector upon over-torquing and/or repetitive use.

Another advantage is that the entire length of the thread profile is engaged. A further advantage is that the connection may be used with different size drill strings. Still yet another advantage is the quick make-up of the various joints as well as providing for multiple make-up and break-down during drilling. Another advantage is that the thread life of the joint is increased.

A feature of the present invention includes a protuberance adapted for cooperation with the shoulder groove that allows for more metal-to-metal contact between the two joints thereby precluding flaring out of the box connector. The protuberance is generally in the form of an annular ring-like member having a bull nose cross-section. Another feature includes the protuberance being located on the box connector and the groove being located on the pin connector.

Yet another feature includes a second embodiment wherein the protuberance is disposed on both box and pin connectors with cooperating grooves on both box and pin connectors. Still yet another feature includes an embodiment wherein the protuberance is disposed on the pin connector only, and the groove is disposed on the box connector only. Still yet another feature includes the invention is applicable to different types of threads and uses.

One of the objectives of the present invention is to maximize the number of cycles of the pin connector by using a radius to reduce the sliding action of the box and pin rotary shoulders. The connection of the present invention, in typical use, will last a full year withstanding 1000 to 1500 make ups and break outs without fatiguing the pin connector. It will also increases the life of the threads.

Other objects and advantages of the invention will appear from the following description.

BRIEF DESCRIPTION OF THE PREFERRED EMBODIMENTS

For a detailed description of a preferred embodiment of the invention, reference will now be made to the accompanying drawings wherein:

FIG. 5 is an illustrated view of three sections of a tubular string, with the individual tubular members having the connection shown in FIG. 2 of the present invention.

FIG. 10 is an illustrated view of three sections of a tubular string, with the individual tubular members having the connection shown in FIGS. 6 and 7 of the present invention.

DESCRIPTION OF THE PREFERRED EMBODIMENTS

Figure 1:
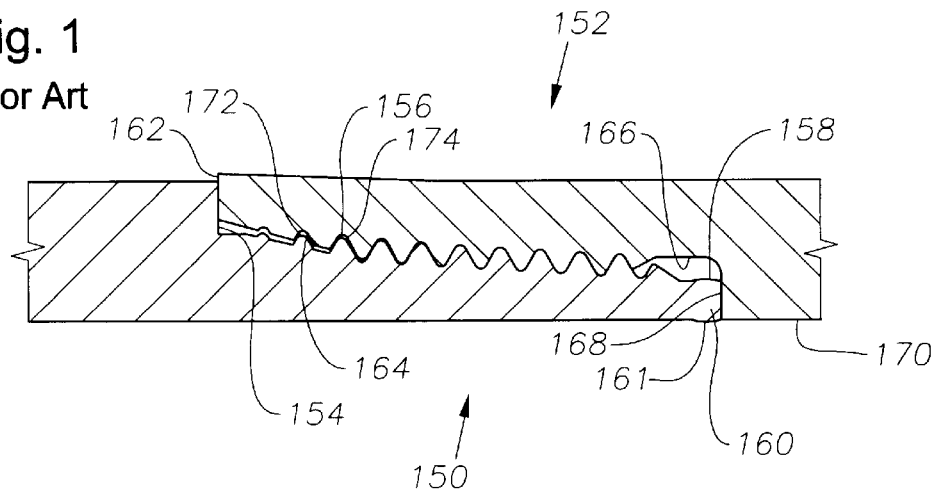
FIG. 1 is a cross-sectional view of a prior art connection showing flared threads.
Figure 2:
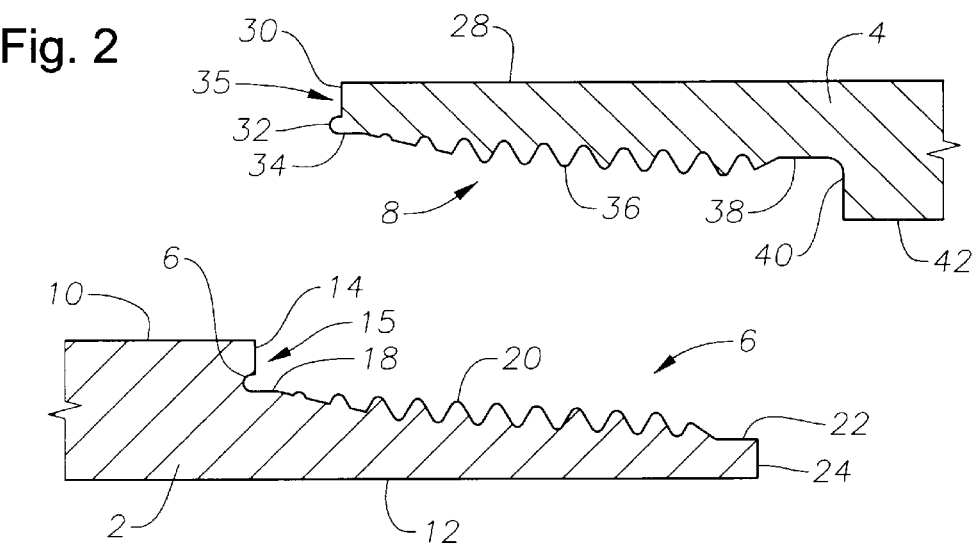
FIG. 2 is a cross-sectional view of a first preferred embodiment of the present invention.

Referring initially to FIG. 2, there is shown a preferred embodiment of the connection of the present invention for connecting two pipes or tubular members for assembling a drill string. As will be understood by those of ordinary skill in the art, each tubular member has a first end being referred to as the pin and a second end being referred to as a box. Two tubular members are shown in FIG. 2, a first tubular member 2 and a second tubular member 4. The first tubular member 2 has at one end a pin connector 6 of the present invention while the second tubular member 4 has at one end a box connector 8 of the present invention. The pin connector 6 is adapted for threaded connection to the box connector 8 to form the connection of the present invention as is hereinafter described in further detail. It should be appreciated, of course, that there is a box connector (not shown) on the other end of first tubular member 2 and a pin connector (not shown) on the other end second tubular member 4.

The first tubular member 2 is a generally cylindrical member or pipe having an outer diameter 10 and an inner diameter 12 with the pin connector 6 of the present invention on its terminal end. The pin connector 6 includes an outer annular shoulder 15 having an outer radial collar portion 14 and an adjacent inner annular groove 16 both facing in a direction which is generally transverse to the axis of the tubular member 2. An external thread profile 20 extends from an outer cylindrical surface 18 at the base of groove 16 to an outer cylindrical surface 22 adjacent the radial terminal end 24 of tubular member 2.

The second tubular member 4 is a generally cylindrical member or pipe having an outer diameter 28 and an inner diameter 42 with the box connector 8 of the present invention on its terminal end. The box connector 8 includes an inner annular shoulder 40 facing in a direction which is generally transverse to the axis of the tubular member 4. An internal thread profile 36 extends from an inner cylindrical surface 38 at the base of shoulder 40 to an inner cylindrical surface 34 adjacent the radial terminal end 30 of tubular member 4.

The radial terminal end 35 includes a collar portion 30 and an adjacent protuberance 32 in the form of a ring-like annular member adapted for insertion into groove 16 upon the threaded engagement of pin connector 6 and box connector 8. It should be noted that the protuberance shown includes a cross-section in the shape of a knob or radius; however, other shapes may be used such as an angled surface and wherein the groove 16 is adapted to cooperate with the angled surface. Further, the length and radius of the protuberance 32 may be varied, which in turn would vary the depth of the groove 16 with these variables being dependent on the amount of metal-to-metal surface contact desired.

The three types of preferred threads for the connection of the present invention include a standard 30° V thread with a radius root and a radius crest, a thread with a 45° angle on the stab flank and a 30° angle on the load flank, or a thread with a 3 or 4° reverse angle load flank (a hook load flank) and a 7° stab flank. It is preferred in a multi-make-up type connection that the threads have a steep taper typically starting at two inches per foot. With a steep taper, the pin connector 6 stabs deeper into the box connector 8 before engagement of the threads thereby requiring less time for make-up. This also lessens wear on the threads.

The hook load thread is by far the better connection once made up because it tends to prevent sliding between the surfaces of shoulder 15 and radial terminal end 35. However, the hook load thread does not wear as well as the V thread because of the large number of makes and breaks of the connection.

Various types of threads may be used in the connection. It should be understood that any type of a quick, robust, industry standard thread may be used. The connection may use a square thread, a hook load thread, or a V type thread. Other types of thread profiles applicable to the present invention include buttress, acme, premium, and other types of threads. The threads are typically dictated by the customer.

In operation, pin connector 6 on tubular member 2 is stabbed into box connector 8 of tubular member 4. Upon the engagment of the thread profiles 20, 36, one of the tubular members 2, 4 is rotated with respect to the other to threadingly engage the connectors 6, 8. As the threading engagement continues, annular protuberance 32 is received into groove 16. As the connection is fully made up, protuberance 32 is fully received by and landed within groove 16 and terminal end 24 abuts annular shoulder 40. The surfaces of shoulder 15 and radial terminal end 35 are then fully engaged to inhibit sliding therebetween. The torque is then increased to fully make-up the connection.

Figure 3:
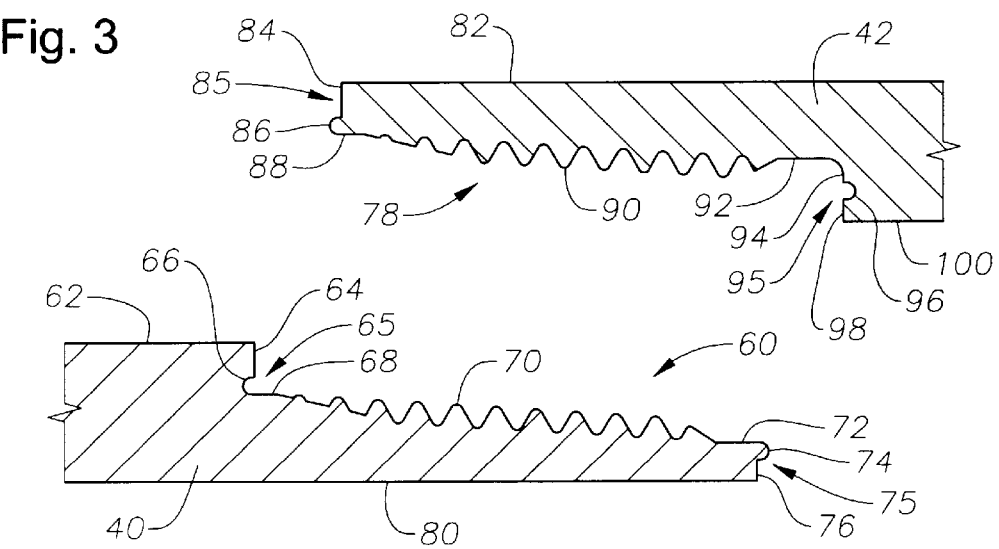
FIG. 3 is a cross-sectional view of a second preferred embodiment of the present invention.

Referring now to FIG. 3, there is shown another preferred embodiment of the connection of the present invention. In this alternative embodiment, a first tubular member 40 has at one end a pin connector 60 of the present invention and a second tubular member 42 has at one end a box connector 78. The pin connector 60 is adapted for threaded connection to the box connector 78 to form the connection of the present invention as is hereinafter described in further detail. It should be appreciated, of course, that there is a box connector (not shown) on the other end of first tubular member 40 and a pin connector (not shown) on the other end second tubular member 78.

The first tubular member 40 is a generally cylindrical member or pipe having an outer diameter 62 and an inner diameter 80 with the pin connector 60 of the present invention on its terminal end. The pin connector 60 includes an outer annular shoulder 65 having a radial collar portion 64 and an adjacent groove 66 both facing in a direction which is generally transverse to the axis of the tubular member 40. The groove 66 terminates at diameter surface 68 of tubular member 40. An external thread profile 70 extends from cylindrical surface 68 at the base of groove 66 to cylindrical surface 72 adjacent the radial terminal end 75 of tubular member 40.

The radial terminal end 75 includes a collar portion 76 and a protuberance 74 both which face in a direction generally transverse to the axis of tubular member 78. Protuberance 74 is a ring-like annular member having a cross-section in the shape of a knob or radius and adapted for insertion into groove 96 upon the threaded engagement of pin connector 60 and box connector 78 as hereinafter decribed.

The second tubular member 42 is a generally cylindrical member or pipe having an outer diameter 82 and an inner diameter 100 with the box connector 78 of the present invention on its terminal end. The box connector 78 includes an inner annular shoulder 95 having a collar portion 98 and an adjacent annular groove 96 both which face in a direction generally transverse to the axis of tubular member 78. The collar portion 98 extends from the inner diameter 100 to the groove 96. An internal thread profile 90 extends from cylindrical surface 92 at the base of groove 96 to cylindrical surface 88 adjacent the radial terminal end 85 of tubular member 42.

The radial terminal end 85 includes a collar portion 84 and a protuberance 86 which extends from the inner diameter surface 88 to collar portion 84 both which face in a direction generally transverse to the axis of tubular member 78. Protuberance 86 is a ring-like annular member having a cross-section in the shape of a knob or radius and adapted for insertion into groove 66 upon the threaded engagement of pin connector 60 and box connector 78 as hereinafter decribed.

In operation, pin connector 60 on tubular member 40 is stabbed into box connector 78 of tubular member 42. Upon the engagment of the thread profiles 70, 90, one of the tubular members 40, 42 is rotated with respect to the other to threadingly engage the connectors 60, 78. As the threading engagment continues, annular protuberance 86 on box connector 78 is first received into groove 66 of pin connector 60 and then protuberance 74 of pin connector 60 is received into groove 96 of box connector 78. As the connection is fully made up, protuberance 86 is fully received by and landed within groove 66 and protuberance 74 is fully received into and landed within groove 96. The surfaces of shoulder 65 fully engage radial terminal end 85 and the surfaces of shoulder 95 fully engage radial terminal end 75 to inhibit sliding during drilling. Further collar portions 64, 84 and 76, 98 are in abutting engagment. The torque is then increased to fully make-up the connection.

Figure 4:
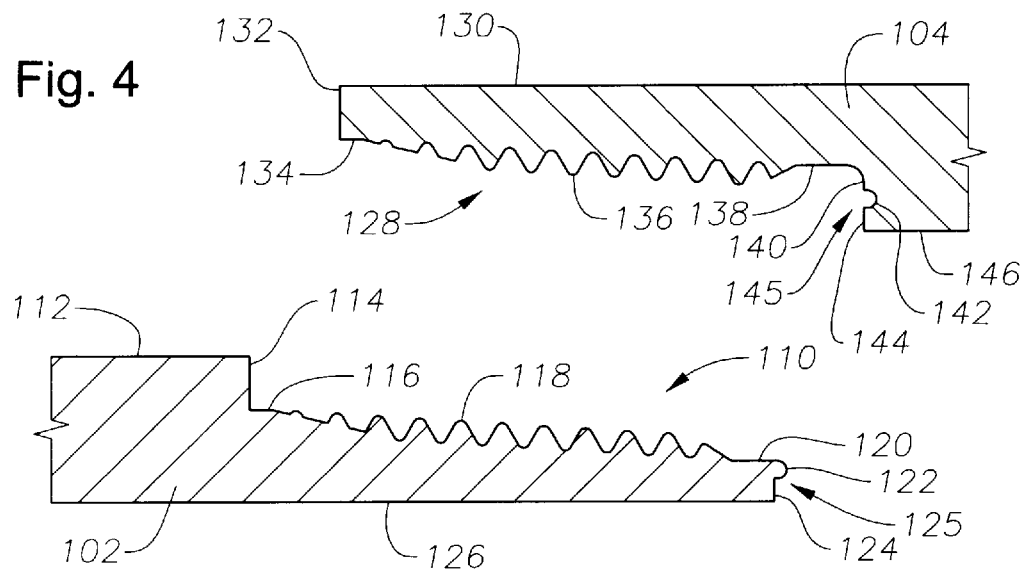
FIG. 4 is a cross-sectional view of a third preferred embodiment of the present invention.

Referring now to FIG. 4, there is shown another preferred embodiment of the connection of the present invention. In this alternative embodiment, a first tubular member 102 has at one end a pin connector 110 of the present invention and a second tubular member 104 has at one end a box connector 128. The pin connector 110 is adapted for threaded connection to the box connector 128 to form the connection of the present invention as is hereinafter described in further detail. It should be appreciated, of course, that there is a box connector (not shown) on the other end of first tubular member 102 and a pin connector (not shown) on the other end second tubular member 102.

The first tubular member 102 is a generally cylindrical member or pipe having an outer diameter 112 and an inner diameter 126 with the pin connector 110 of the present invention on its terminal end. The pin connector 110 includes an outer annular shoulder 114 generally perpendicular to the axis of the tubular member 102. The shoulder 114 extends from outer diameter 112 to cylindrical surface 116 of tubular member 102. An external thread profile 118 extends from cylindrical surface 116 at the base of shoulder 114 to cylindrical surface 120 adjacent the radial terminal end 125 of tubular member 102.

The radial terminal end 125 includes a collar portion 124 and a protuberance 122 both which face in a direction generally transverse to the axis of tubular member 102. Protuberance 122 is a ring-like annular member having a cross-section in the shape of a knob or radius and adapted for insertion into groove 142 upon the threaded engagement of pin connector 110 and box connector 128 as hereinafter decribed.

The second tubular member 128 is a generally cylindrical member or pipe having an outer diameter 130 and an inner diameter 146 with the box connector 128 of the present invention on its terminal end. The box connector 128 includes an inner annular shoulder 145 having a collar portion 144 and an adjacent annular groove 142 both which face in a direction generally transverse to the axis of tubular member 104. The collar portion 144 extends from the inner diameter 146 to the groove 142. An internal thread profile 136 extends from cylindrical surface 138 at the base of groove 142 to cylindrical surface 134 adjacent the radial terminal end 132 of tubular member 104.

The radial terminal end 132 is an annular shoulder which is generally perpendicular to the axis of tubular member 104.

Radial terminal end 132 is adapted for abutting engagement with shoulder 114 upon the threaded engagement of pin connector 110 and box connector 128 as hereinafter decribed.

In operation, pin connector 110 on tubular member 102 is stabbed into box connector 128 of tubular member 104. Upon the engagment of the thread profiles 118, 136, one of the tubular members 102, 104 is rotated with respect to the other to threadingly engage the connectors 110, 128. As the threading engagment continues, annular protuberance 122 is received into groove 146. As the connection is fully made up, protuberance 122 is fully received by and landed within groove 146 and terminal end 132 abutts annular shoulder 114. The surfaces of shoulder 145 engage radial terminal end 125 to inhibit sliding therebetween during drilling. The torque is then increased to fully make-up the connection.

Referring now to FIG. 5, there is shown a drill string 150 assembling tubular members 180, 182, 184 and 186 having the preferred connection of FIG. 3 of the present invention. It should be noted that like reference numerals appearing in the various figures refer to like components. It should be appreciated that although the connection of FIG. 3 is illustrated in FIG. 5 that the connection of FIGS. 2 and 4 are also applicable. Tubular members 180, 182, 184 and 186 each have a pin connector 60 and box connector 78 on their respective ends and are threadingly joined by thread profiles 70, 90. For each connection of pin connector 60 and box connector 78, annular protuberance 86 on box connector 78 is received into groove 66 of pin connector 60 and protuberance 74 of pin connector 60 is received into groove 96 of box connector 78. The surfaces of shoulder 65 fully engage radial terminal end 85 and the surfaces of shoulder 95 fully engage radial terminal end 75 to inhibit sliding during drilling. Further collar portions 64, 84 and 76, 98 are in abutting engagment.

In the embodiments of FIGS. 2–5 of the present application, the protuberance was a thin annular ring-like member that was received into a grove to prevent sliding between the surfaces. In the embodiments to be described, the protuberance has a much larger radius and extends across the shoulder and terminal end. A thin protuberance may become damaged in the field before it is fully made up into the groove. If the protuberance becomes damaged, it will not fit properly into the groove. Further, the thin protuberance may be more difficult to manufacture.

Figure 6:
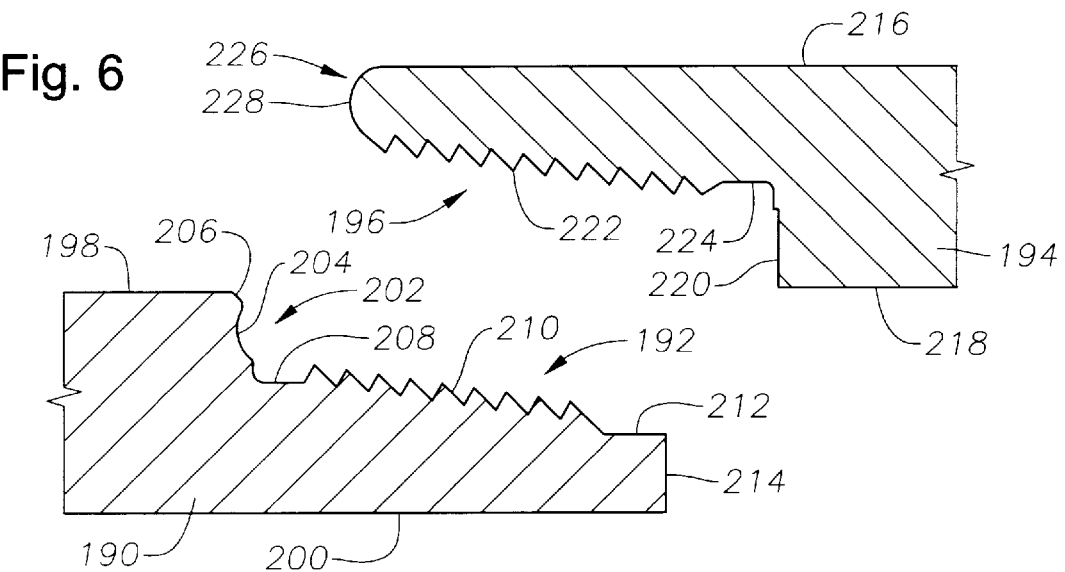
FIG. 6 is a cross-sectional view of the pin and box connectors of another preferred embodiment of the present invention.
Figure 7:
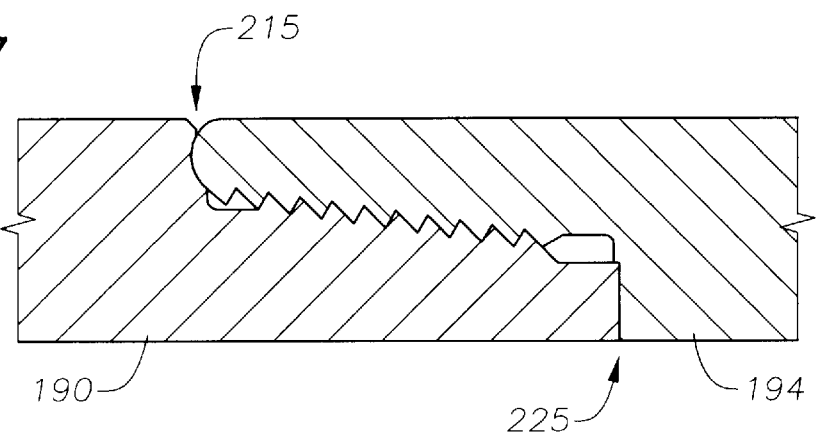
FIG. 7 is a cross-sectional view of the pin and box connectors of FIG. 6 in the engaged position.

Referring now to FIGS. 6 and 7, there is shown another preferred embodiment of the connection of the present invention. In this alternative embodiment, a first tubular member 190 has at one end a pin connector 192 of the present invention and a second tubular member 194 has at one end a box connector 196. The pin connector 192 is adapted for threaded connection to the box connector 196 to form the connection of the present invention as is hereinafter described in further detail. It should be appreciated, of course, that there is a box connector (not shown) on the other end of first tubular member 190 and a pin connector (not shown) on the other end second tubular member 194.

The first tubular member 190 is a generally cylindrical member or pipe having an outer diameter 198 and an inner diameter 200 with the pin connector 192 of the present invention on its terminal end. The pin connector 192 includes an outer annular shoulder 202 having an annular groove or concave radiused surface 204 facing in a direction which is generally transverse to the axis of the tubular member 190. The concave radiused surface 204 extends across the entire shoulder 202. The outer edge of concave radiused surface 204 is chamfered at 206 and the inner edge of concave radiused surface 204 extends to cylindrical surface 208. There should be no sharp outer radial edge on concave radiused groove 204 so that outer edge is not bent inwardly to prevent the convex radiused surface 228 from being received by concave radiused surface 204.

An external thread profile 210 extends from cylindrical surface 208 at the base of concave radiused surface 204 to cylindrical surface 212 adjacent the radial terminal end 214 of tubular member 190. Preferably the thread profile is a hook load thread.

The second tubular member 194 is a generally cylindrical member or pipe having an outer diameter 216 and an inner diameter 218 with the box connector 196 of the present invention on its terminal end. The box connector 196 includes an inner annular shoulder 220 facing in a direction which is generally transverse to the axis of the tubular member 194. An internal thread profile 222 extends from cylindrical surface 224 at the base of shoulder 220 to the radial terminal end 226 of tubular member 194. It can be seen that thread reliefs are provided for both thread profiles 210 and 222.

The radial terminal end 226 includes a protuberance or convex radiused surface 228 in the form of a ring-like annular member adapted for insertion into concave radiused surface 204 upon the threaded engagement of pin connector 192 and box connector 196. Convex radiused surface 228 has a cross-section in the shape of a bull nose or arcuate radius. The radius of nose 228 extends across the entire terminal end of box 196 and is slightly smaller, such as by a few thousandths of an inch, than the radius of the concave radiused surface 204 at the base of the pin connector 192. Thus the inserting convex radiused surface 228 is a few thousandth's of an inch smaller than the receiving concave radiused surface 204. This allows the convex radiused surface 228 to easily be received by concave radiused surface 204. Further, the length and radius of the pconvex radiused surface 228 may be varied, which in turn would vary the depth of concave radiused surface 204 with these variables being dependent on the amount of metal-to-metal surface contact desired.

In operation, pin connector 192 on tubular member 190 is stabbed into box connector 196 of tubular member 194. Upon the engagment of the thread profiles 210, 222, one of the tubular members 190, 194 is rotated with respect to the other to threadingly engage the connectors 192, 196. As the threading engagment continues, convex radiused surface 228 is received into concave radiused surface 204. As the connection is fully made up, convex radiused surface 228 is fully received by and landed within concave radiused surface 204 to form a non-sliding radiused surface connection 215 and terminal end 214 abuts annular shoulder 220 to form an abutting shoulder connection 225. The radiused surfaces of shoulder 202 and radial terminal end 226 engage to inhibit sliding during drilling. The torque is then increased to fully make-up the connection.

Figure 8:
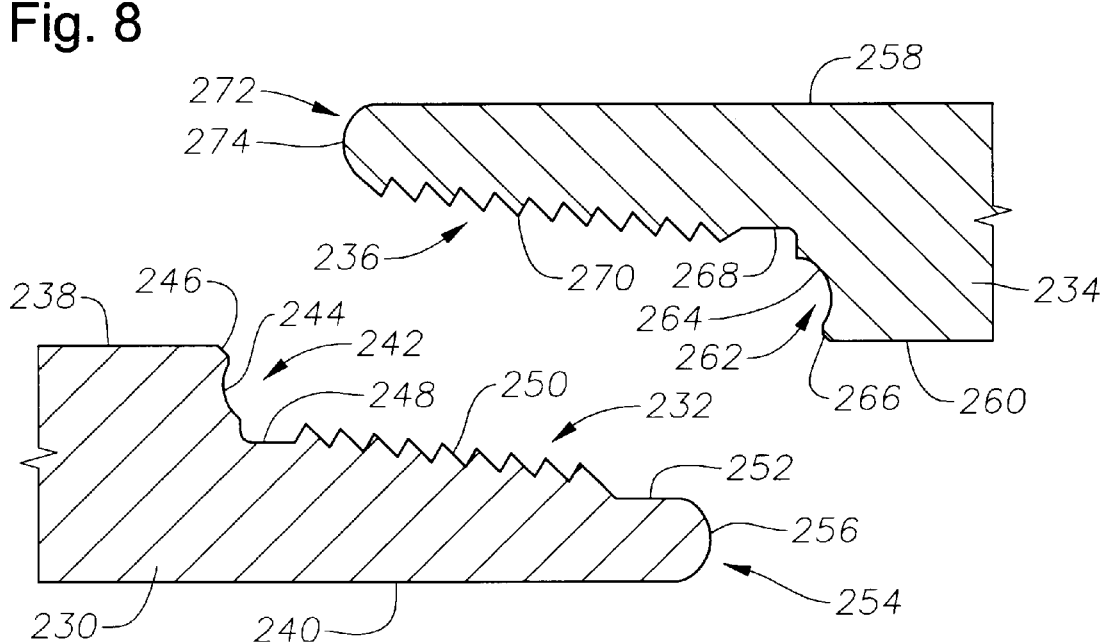
FIG. 8 is a cross-sectional view of the pin and box connectors of a still another preferred embodiment of the present invention.
Figure 9:
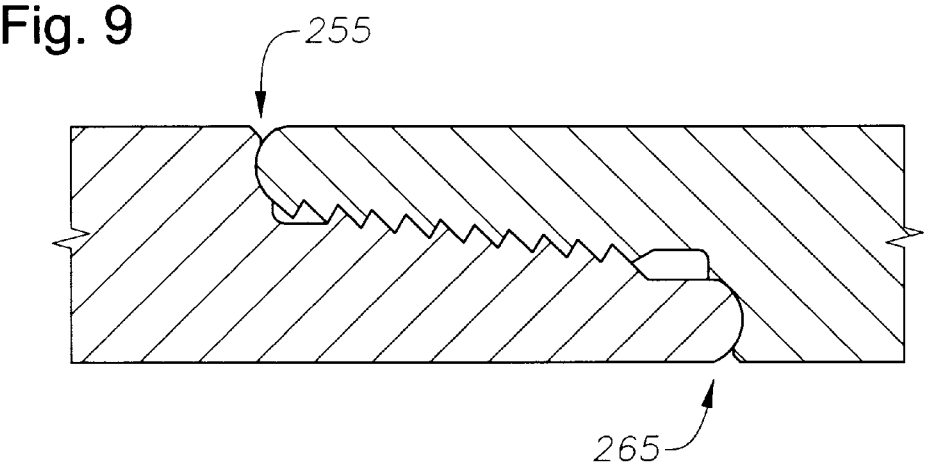
FIG. 9 is a cross-sectional view of the pin and box connectors of FIG. 8 in the engaged position.

Referring now to FIGS. 8 and 9, there is shown still another preferred embodiment of the connection of the present invention. In this alternative embodiment, a first tubular member 230 has at one end a pin connector 232 of the present invention and a second tubular member 234 has at one end a box connector 236. The pin connector 232 is adapted for threaded connection to the box connector 236 to form the connection of the present invention as is hereinafter described in further detail. It should be appreciated, of course, that there is a box connector (not shown) on the other end of first tubular member 230 and a pin connector (not shown) on the other end second tubular member 234.

The first tubular member 230 is a generally cylindrical member or pipe having an outer diameter 238 and an inner diameter 240 with the pin connector 232 of the present invention on its terminal end. The pin connector 232 includes an outer annular shoulder 242 having a groove or concave radiused surface 244 facing in a direction which is generally transverse to the axis of the tubular member 230. The concave radiused surface 244 extends across the entire shoulder 242. The outer edge of concave radiused surface 244 is chamfered at 246 and the inner edge of concave radiused surface 244 extends to cylindrical surface 248. An external thread profile 250 extends from cylindrical surface 248 at the base of concave radiused surface 244 to cylindrical surface 252 adjacent the radial terminal end 254 of tubular member 40.

The radial terminal end 254 includes a protuberance or convex radiused surface 256 which faces in a direction generally transverse to the axis of tubular member 230. Convex radiused surface 256 is a ring-like annular member adapted for insertion into concave radiused surface 264, hereinafter described, upon the threaded engagement of pin connector 232 and box connector 236. Convex radiused surface 256 has a cross-section in the shape of a bull nose or arcuate radius and extends across the entire terminal end 254 of pin connector 232. Convex radiused surface 256 is slightly smaller, such as by a few thousandths of an inch, than the radius of the concave radiused surface 264 at the base of the box connector 236. Thus the inserting radius 256 is a few thousandth's of an inch smaller than the receiving radius 264.

The second tubular member 234 is a generally cylindrical member or pipe having an outer diameter 258 and an inner diameter 260 with the box connector 236 of the present invention on its terminal end. The box connector 236 includes an inner annular shoulder 262 having a annular groove or concave radiused surface 264 which faces in a direction generally transverse to the axis of tubular member 234. Concave radiused surface 264 extends across the entire shoulder 262. The outer edge of concave radiused surface 264 is chamfered at 266 and the inner edge of groove 264 extends to cylindrical surface 268. An internal thread profile 270 extends from cylindrical surface 268 at the base of groove 264 to the radial terminal end 272 of tubular member 234.

The radial terminal end 272 includes a protuberance or convex radiused surface 274 which extends from the end of thread profile 270 to diameter surface 258 and faces in a direction generally transverse to the axis of tubular member 234. Convex radiused surface 256 is a ring-like annular member adapted for insertion into concave radiused surface 264, hereinafter described, upon the threaded engagement of pin connector 232 and box connector 236. Convex radiused surface 274 has a cross-section in the shape of a bull nose or arcuate radius. Convex radiused surface 274 extends across the entire terminal end 272 of box connector 236 and is slightly smaller, such as by a few thousandths of an inch, than the radius of concave radiused surface 244 at the base of the pin connector 232. Thus the inserting radius 274 is a few thousandth's of an inch smaller than the receiving radius 244.

In operation, pin connector 232 on tubular member 230 is stabbed into box connector 236 of tubular member 234. Upon the engagment of the thread profiles 250, 270, one of the tubular members 230, 234 is rotated with respect to the other to threadingly engage the connectors 232, 236. As the threading engagment continues, convex radiused surface 274 on box connector 236 is first received by concave radiused surface 244 of pin connector 232 and convex radiused surface 256 of pin connector 232 is then received into concave radiused surface 264 of box connector 236. As the connection is fully made up, convex radiused surface 274 is fully received by and landed within concave radiused surface 244 to form a non-sliding radiused connection 255 and convex radiused surface 256 is fully received by and landed in concave radiused surface 264 to form another non-sliding radiused connection 265. The torque is then increased to fully make-up the connection. The radiused connections 255 and 265 inhibit sliding between the surfaces during drilling.

Referring now to FIG. 10, there is shown a drill string 278 assembling tubular members 280, 282, 284 and 286 having the preferred connection of FIGS. 6 and 7 of the present invention. It should be noted that like reference numerals appearing in the various figures refer to like components. It should be appreciated that although the connection of FIGS. 6 and 7 is illustrated in FIG. 10 that the connection of FIGS. 8 and 9 is also applicable. Tubular members 280, 282, 284 and 286 each have a pin connector 192 and box connector 196 on their respective ends and are threadingly joined by thread profiles 210, 222. For each connection of pin connector 192 and box connector 196, convex radiused surface protuberance 228 on box connector 196 is received into concave radiused surface 204 of pin connector 192 to form a rotary non-sliding radiused connection 215 and abutting shoulder 214 of pin connector 192 is abuts shoulder 220 of box connector 196 to form an abutting shoulder connection 225.

The contoured concave and convex radiused surfaces provide a much greater contact surface than that of the prior art. Because there is more metal-to-metal contact and the mass of the metal is increased, there is less tendency for the two contoured radiused surfaces to slide against each other during over-torquing and cyclic bending. The engaging contoured radiused surfaces act like mating bearing surfaces. The radiusd shoulders of the embodiments of FIGS. 6–10 tend not to lock but prevent the shoulders from sliding back and forth against each other as the pipe bends. This minimizes the yielding of the terminal end of the box connector during the cycling motion of the drill string.

Upon make-up, the terminal end of the box connector engages the outer shoulder of the pin connector first and then after a further travel of a few thousandths of an inch, the terminal end of the pin connector engages the inner shoulder of the box connector upon full make-up. Thus, the terminal end of the box connector and the outer shoulder on the pin connector will give upon full make-up. Although there is interference, it is not the type of planned interference, such as in an oil field premium connection, where a metal-to-metal seal is formed for sealing fluid pressure. The objective of landing the terminal end of the box connector first is to take some compression off of the pin connector which tends to be the member that yields first.

Increased torque is applied to the connection of the present invention in order to properly engage the thread profiles and join the cooperating shoulders together. The preferred amount of torque depends upon the size of the connection. For example, the present invention is typically used on pipe sizes of $2\frac{3}{8}^{th}$'s and larger. A $2\frac{3}{8}^{th}$'s inch size has a preferred torque 2,400 to 2,500 foot-pounds.

In the drilling operation, the drill string is placed into a bore hole with a high deviation. Further, it should be appreciated that the number of joined tubular members may be several thousand. Therefore, the forces applied to the various pin and box connections is very significant. The connection of the present invention assures that the thread profiles are engaged. Further, the buckling forces are controlled by the mating radiused surfaces and the mating collar portions and shoulders. Also, the tubular members can then be used to pull a reamer back through the bore hole. The tubular members may be used multiple times.

The connection of the present invention solves the prior art problems and deficiencies by having a single convex radiused surface located on the pin connector, or a single convex radiused surface located on the box, or having a convex radiused surface located on both the box and pin connectors. The mating radiused shoulders keeps the pin or box connectors from expanding as opposed to prior art connections. The convex radiused surface is adapted for cooperation with the concave radiused surface which in turn allows for more metal-to-metal contact between the two tubular members which provides more metal to strength the connection thereby precluding flaring out of the box. Further, the thread profiles are kept properly engaged thereby preventing the rocking seen in prior art connections. Moreover, even if the terminal end of the box connector flares, the thread profiles will be kept engaged. This allows for multiple uses and prevents the failure of the pin connector while the drill string is in use.

Changes and modifications in the specifically described embodiments can be carried out without departing from the scope of the invention which is intended to be limited only by the scope of the appended claims.

I claim:

1. A drill string having an inner diameter and an outer diameter, comprising:
   a first pipe having a pin end including:
      an external thread member formed thereon;
      a first radial end extending from said external thread member;
      an exterior shoulder formed on the outer diameter of the first pipe having a first groove forming a first surface;
   a second pipe having a box end including:
      an internal thread member formed thereon;
      a second radial end extending from said internal thread member and having
   a protuberance forming a second surface;
      an interior shoulder formed on the inner diameter of the second pipe;
      said first and second surfaces being rounded increasing metal-to-metal contact between said pin and box ends as torque is applied upon make-up;
   said first radial end and said internal shoulder engaging as torque is applied upon make-up; and
      said first groove receiving said protuberance and said internal and external thread members forming a substantially common taper upon make-up of said pin and box ends.

2. The drill string of claim 1 wherein said first and second surfaces have portions thereof which are substantially parallel to a longitudinal axis of said pipes thereby forming a non-sliding engagement upon make-up.

3. The drill string of claim 1 wherein the thread members include a hook load type thread for repeated make-up.

4. The drill string of claim 1 further including a second groove formed on said interior shoulder of said second pipe and having a third surface and including a second protuberance formed on said first radial end of said first pipe and having a fourth surface wherein said second groove receives and engages said second protuberance upon make-up.

5. The drill string of claim 4 wherein said third and fourth surfaces are rounded increasing metal-to-metal contact between said pin and box ends as torque is applied upon make-up.

6. The drill string of claim 5 wherein the drill string includes a third pipe having a pin end and a box end, and wherein said first pipe contains a box end and said second pipe contains a pin end.

7. The drill string of claim 6 further including a third pipe having a pin end and a box end and wherein said box end of said second pipe contains another groove, and wherein said pin end of said third pipe contains a third protuberance, and wherein said another groove and said third protuberance are adapted to cooperate.

8. A tubular drill string comprising:
   a first pipe and a second pipe having inner and outer diameters;
   a pin end on said first pipe having a first shoulder, a first thread and a first radial end, said first shoulder having a first collar and a first groove with a first surface;
   a box end on said second pipe having a second radial end, a second thread for threadingly engaging said first thread, and a second shoulder, said second radial end having a second collar and a second protruding member with a second surface positioned on said box end of said second pipe to be received by said first groove on said pin end upon make-up of the connection;
   said first and second surfaces being radiused to increase surface contact between said pin and box ends as torque is applied upon make-up; and
   said first radial end abutting said second shoulder upon make-up.

9. The tubular drill string of claim 8 wherein said first and second collars abut upon make-up.

10. The tubular drill string of claim 8 wherein said second shoulder includes a third collar and a second groove having a third surface and said first radial end has a fourth collar and a first protruding member with a fourth surface, said third and fourth surfaces being radiused to increase surface contact between said pin and box ends as torque is applied upon make-up.

11. The tubular drill string of claim 10 wherein said third and fourth collars abut upon make-up.

12. A connection comprising:
   a pin connector having a first terminal end, a first shoulder with a first radiused surface, and first threads extending from said first terminal end to said first shoulder;
   a box connector having a second terminal end with a second radiused surface, a second shoulder, and second threads extending from said second terminal end to said second shoulder;
   said first radiused surface extending across said first shoulder and said second radiused surface extending across said second terminal end;
   said first terminal end contacting said second shoulder upon make-up; and
   said first and second radiused surfaces engaging upon make-up.

13. A connection comprising:
   a box connector having a first terminal end, a first shoulder with a first radiused surface, and first threads extending between said first terminal end and said first shoulder;

a pin connector having a second terminal end with a second radiused surface, a second shoulder, and said second threads extending between said second terminal end and said second shoulder;

said first radiused surface extending across said first shoulder and said second radiused surface extending across said second terminal end;

said first terminal end contacting said second shoulder upon make-up, and said first and second radiused surfaces engaging upon make-up.

14. A connection comprising:

a pin connector having a first terminal end with a first radiused surface, a first shoulder with a second radiused surface, and first threads extending between said first terminal end and said first shoulder;

a box connector having a second terminal end with a third radiused surface, a second shoulder with a fourth radiused surface, and second threads extending between said second terminal end and said second shoulder;

said first radiused surface extending across said first terminal end and said fourth radiused surface extending across said second-shoulder;

said second radiused surface extending across said first shoulder and said third radiused surface extending across said second terminal end;

said first and fourth radiused surfaces engaging upon make-up; and said second and third radiused surfaces engaging upon make-up.

15. A connector comprising:

a pin connector having a first terminal end, a first shoulder having a first annular recess, and a first threaded portion extending between said first terminal end and said first shoulder;

a box connector having a second terminal end, a second shoulder having a second annular recess, and a second threaded portion extending between said second terminal end and said second shoulder;

said first threaded portion threadingly engaging said second threaded portion upon make-up;

said second annular recess receiving said first terminal end upon make-up; and said first annular recess receiving said second terminal end upon make-up.

* * * * *